S. MARSH.
APPARATUS FOR DESCENDING GRADIENTS.
No. 44,965. Patented Nov. 8, 1864.
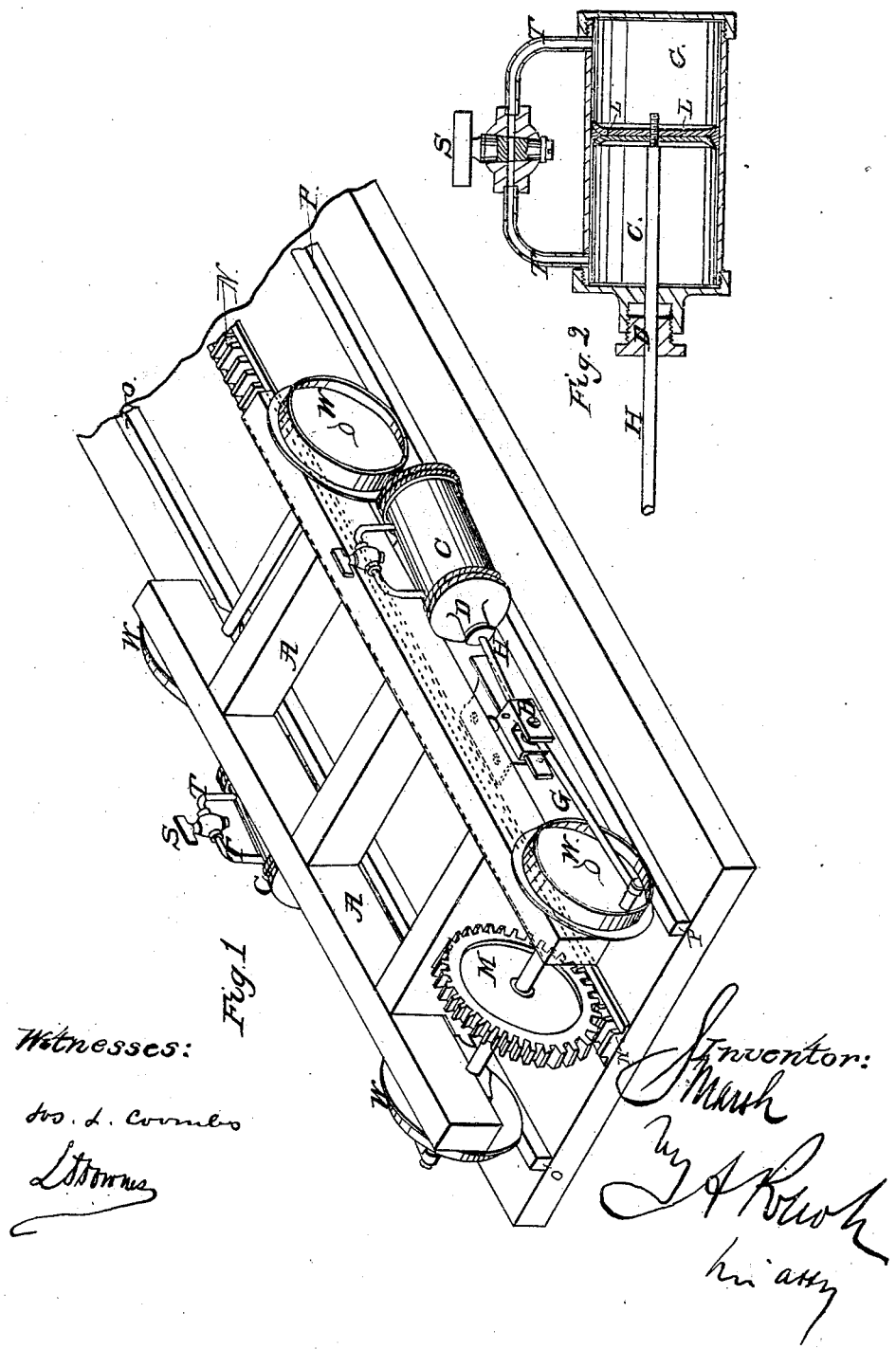

UNITED STATES PATENT OFFICE.

SYLVESTER MARSH, OF CHICAGO, ILLINOIS.

IMPROVEMENT IN APPARATUS FOR DESCENDING GRADIENTS.

Specification forming part of Letters Patent No. 44,965, dated November 8, 1864.

*To all whom it may concern:*

Be it known that I, SYLVESTER MARSH, of Chicago, in the county of Cook and State of Illinois, have invented certain new and useful improvements in atmospheric brakes or brakes to be operated by more or less elastic fluids; and I hereby declare that the following is a full, clear, and exact description of the same, reference being had to the accompanying drawings, in which—

Figure 1 is an isometrical perspective view of a truck or wheeled frame to which my said invention is applied, and Fig. 2 is a sectional detail view of the cylinder C of Fig. 1.

Most or all the brakes heretofore constructed or in use involve the principle of the application of power directly or indirectly to a mechanism whereby friction is produced of an intensity proportionate to the power applied. For reasons too well known to persons acquainted with this particular branch of the art, it is dangerous and expensive to use brakes of such construction on inclined planes.

The object of this invention is the construction of a brake which, on account of the absence of excessive friction on the wheels or on the rails, is less destructive to the road and material—a brake in which the power of man is applied neither directly nor indirectly—*i. e.*, through the intermediary of chains or levers—to the wheels or to the rails, and in which power produced, obtained at no inconsiderable cost, is not wasted—*i e.*, absorbed by the mechanism actuating the brake—and, lastly, a brake the force of which may be regulated at the pleasure of the attendant; and my invention consists in coupling one or more wheels of railway-carriages, locomotives, or other wheeled vehicle or apparatus with a movable piston or diaphragm of a cylinder filled with air or other more or less elastic fluid, in combination with valves or other equivalent means for regulating the egress from and the ingress to or the displacement in the said cylinder of the contents thereof, substantially as and for the purposes hereinafter set forth.

To enable others to make and use my said invention, I shall now proceed to describe the manner in which the same is or may be carried into effect; and referring to the said drawings—

A is the truck or frame of a car or apparatus intended to run upon an inclined railway—for instance, upon a system of railroads such as patented to me on the 10th day of September, 1861. This truck or frame is supported upon wheels W, upon the axle of the forward pair of which is mounted a cog-wheel, M, which meshes in with a stationary rack or cogs laid upon the track between the two rails O and P. The truck is thus geared with the track, whereby accidental slipping upon the rails of the car or locomotive and tender is avoided and additional force given to ascend gradients. Upon the sides of the frame are cylinders C, made of metal. The heads of the cylinders are secured to the body thereof, and the stuffing-box at D is such as to secure perfect or hermetic packing of the cylinder. The cylinder contains a piston, L, fast on a rod, H, which is truly guided by means of guide-blocks and ways B. To this piston-rod is attached a connecting-rod, G, whereby the wheel W is coupled with the piston-rod. From both ends of the cylinder is started a tube, T, which is furnished at an intermediate point with a one-way cock, S.

The operation of this apparatus is as follows: The air or other fluid with which the cylinder is filled will exert an equal pressure on both sides of the piston—that is, it will be equilibriated—the capacities of the cylinder on either side of the piston being in communication by means of the tube T, which, as shown in Fig. 2, is open. There will be no other resistance to the rotary movement of the wheels than friction of the piston in the cylinder, which, being properly lubricated, is very slight. When the brake is not operated, the piston will freely play in the cylinder, and thus cause the displacement of the air from one side of the cylinder to the other; but when it is intended to operate the brake—that is to say, to create resistance to the rotation of the wheels—it is simply necessary to turn the cock, and thus more or less contract the channel of communication between the two ends of the cylinder. In this way the displacement of the air or other fluid the cylinder may contain is attended with more or less friction or impediment, according to the openings of the cock.

It will be understood that if communication be entirely shut off by the cock, the piston would be brought to a dead stop and the rotation of the wheels entirely discontinued; but in descending inclined planes I prefer to partly close the valve or cock, whereby the speed of the car may be controlled.

I would observe that I do not wish to be understood as claiming the precise construction or arrangement of machinery herein shown and described. The same effect may be produced by a different combination of machinery—for instance, valves may be adapted to each end of the cylinder, which may be arranged to open and close under certain pressures of air, or separate induction and eduction valves may be applied, the one to admit the air at a certain part of the stroke of the piston, and the other to emit it according to openings, to be determined at the pleasure of the operator.

Having thus described my invention and the manner in which the same is or may be carried into effect, I claim—

Coupling one or more wheels of railway carriages, locomotives, or other wheeled vehicle, or apparatus with a movable piston or diaphragm of a cylinder filled with air or other more or less elastic fluid, in combination with valves or other equivalent means for regulating the egress from and ingress to or the displacement in the said cylinder of the contents thereof, substantially as and for the purposes herein set forth.

In testimony whereof I have signed my name to this specification before two subscribing witnesses.

SYLVESTER MARSH.

Witnesses:
CHAS. F. THAYER,
WM. F. BROOKS.